US009523279B2

(12) United States Patent
Herr et al.

(10) Patent No.: US 9,523,279 B2
(45) Date of Patent: Dec. 20, 2016

(54) ROTOR BLADE FENCE FOR A WIND TURBINE

(71) Applicant: General Electric Company, Schenectady, NY (US)

(72) Inventors: Stefan Herr, Greenville, SC (US); Biju Nanukuttan, Bangalore (IN); Santhosha Yelwal Srikanta, Yelwal (IN); Karthick Prabhu, Bangalore (IN)

(73) Assignee: General Electric Company, Schenectady, NY (US)

( * ) Notice: Subject to any disclaimer, the term of this patent is extended or adjusted under 35 U.S.C. 154(b) by 496 days.

(21) Appl. No.: 14/077,300

(22) Filed: Nov. 12, 2013

(65) Prior Publication Data

US 2015/0132138 A1  May 14, 2015

(51) Int. Cl.
*F01D 5/12* (2006.01)
*F03D 1/06* (2006.01)

(52) U.S. Cl.
CPC .............. *F01D 5/12* (2013.01); *F03D 1/0633* (2013.01); *F03D 1/0675* (2013.01);
(Continued)

(58) Field of Classification Search
CPC ........ F01D 5/12; F03D 1/0633; F03D 1/0675; F05B 2240/122; F05B 2240/30; Y02E 10/721
See application file for complete search history.

(56) References Cited

U.S. PATENT DOCUMENTS

| 4,655,419 A | 4/1987 | van der Hoeven |
| 6,540,288 B1 | 4/2003 | Tobin |

(Continued)

FOREIGN PATENT DOCUMENTS

| CN | 201771673 | 3/2011 |
| EP | 0947693 A2 | 10/1999 |

(Continued)

OTHER PUBLICATIONS

PCT Search Report and Written Opinion issued in connection with corresponding PCT Application No. PCT/US2014/060237 on Mar. 19, 2015.

*Primary Examiner* — Igor Kershteyn
(74) *Attorney, Agent, or Firm* — Dority & Manning, P.A.

(57) ABSTRACT

The present invention is directed to a rotor blade assembly for a wind turbine. The rotor blade assembly includes a rotor blade extending from a blade root to a blade tip. The rotor blade has a pressure side surface and a suction side surface. The pressure side surface and the suction side surface each extend between a leading edge and a trailing edge. The assembly also includes a blade root extension configured to attach to one of the pressure side surface or the suction side surface of the rotor blade adjacent to the blade root. The blade root extension includes at least one blade fence and at least one airflow modifying element. The blade fence extends between a proximal end and a distal end in a chord-wise direction. The proximal end is configured to attach to the rotor blade such that the distal end remains free and spaced apart from the rotor blade. The airflow modifying element is configured at the proximal end of the blade fence. As such, the blade root extension is configured to improve aerodynamic performance of the rotor blade.

18 Claims, 8 Drawing Sheets

(52) U.S. Cl.
CPC ..... *F05B 2240/122* (2013.01); *F05B 2240/30* (2013.01); *Y02E 10/721* (2013.01)

(56) References Cited

U.S. PATENT DOCUMENTS

| | | | |
|---|---|---|---|
| 6,910,867 B2 | 6/2005 | Corten | |
| 7,134,631 B2 | 11/2006 | Loth | |
| 7,604,461 B2 | 10/2009 | Bonnet | |
| 7,828,523 B2* | 11/2010 | Bonnet | F03D 1/0633 416/1 |
| 7,909,576 B1 | 3/2011 | van der Bos et al. | |
| 8,083,488 B2 | 12/2011 | Fritz | |
| 8,083,491 B2 | 12/2011 | Garcillan Rueda et al. | |
| 8,162,590 B2 | 4/2012 | Haag | |
| 8,181,912 B2 | 5/2012 | Schwetzler | |
| 8,376,703 B2 | 2/2013 | Carroll et al. | |
| 2003/0091436 A1 | 5/2003 | Stiesdal | |
| 2003/0099546 A1 | 5/2003 | Stiesdal et al. | |
| 2004/0013512 A1 | 1/2004 | Corten | |
| 2006/0280614 A1 | 12/2006 | Quell et al. | |
| 2008/0061192 A1 | 3/2008 | Sullivan | |
| 2008/0145219 A1 | 6/2008 | McVeigh et al. | |
| 2008/0166235 A1 | 7/2008 | Standish et al. | |
| 2008/0175711 A1 | 7/2008 | Godsk | |
| 2008/0217485 A1 | 9/2008 | Ikeda | |
| 2008/0317600 A1 | 12/2008 | Enevoldsen et al. | |
| 2009/0016891 A1 | 1/2009 | Parsania et al. | |
| 2009/0068018 A1 | 3/2009 | Corten | |
| 2009/0087314 A1 | 4/2009 | Haag | |
| 2009/0180889 A1* | 7/2009 | Stiesdal | F03D 1/0675 416/223 R |
| 2010/0008787 A1 | 1/2010 | Godsk | |
| 2010/0028161 A1 | 2/2010 | Vronsky et al. | |
| 2010/0143144 A1 | 6/2010 | Anjuri et al. | |
| 2010/0187366 A1 | 7/2010 | Gupta et al. | |
| 2010/0209258 A1* | 8/2010 | Fuglsang | F03D 1/0641 416/90 R |
| 2010/0215494 A1 | 8/2010 | Bech et al. | |
| 2010/0219296 A1 | 9/2010 | Shelman-Cohen | |
| 2011/0000817 A1 | 1/2011 | Hosoi et al. | |
| 2011/0020128 A1* | 1/2011 | Fuglsang | F03D 1/0675 416/223 A |
| 2011/0142595 A1 | 6/2011 | Santiago et al. | |
| 2011/0142628 A1 | 6/2011 | Xiong | |
| 2011/0142635 A1 | 6/2011 | Fritz | |
| 2011/0142664 A1 | 6/2011 | Anjuri et al. | |
| 2011/0142673 A1 | 6/2011 | Fang et al. | |
| 2011/0217167 A1 | 9/2011 | Hancock et al. | |
| 2011/0223033 A1 | 9/2011 | Wang et al. | |
| 2011/0229321 A1 | 9/2011 | Kilaras | |
| 2012/0051936 A1 | 3/2012 | Eisenberg | |
| 2012/0100005 A1 | 4/2012 | Ostergaard Kristensen et al. | |
| 2012/0134812 A1 | 5/2012 | Nanukuttan et al. | |
| 2012/0151769 A1 | 6/2012 | Brake et al. | |
| 2012/0189444 A1 | 7/2012 | Haag | |
| 2012/0248072 A1 | 10/2012 | McClure et al. | |
| 2012/0256056 A1 | 10/2012 | Seifert et al. | |
| 2012/0257977 A1 | 10/2012 | Jensen et al. | |
| 2012/0257978 A1 | 10/2012 | Jensen et al. | |
| 2012/0257979 A1 | 10/2012 | Jensen et al. | |
| 2012/0282105 A1 | 11/2012 | Grife et al. | |

FOREIGN PATENT DOCUMENTS

| | | |
|---|---|---|
| EP | 1674723 A2 | 6/2006 |
| EP | 1873395 A1 | 1/2008 |
| EP | 2031243 A1 | 3/2009 |
| EP | 2369133 A1 | 9/2011 |
| EP | 2484895 A1 | 8/2012 |
| EP | 2548801 A1 | 1/2013 |
| GB | 2 374 331 | 10/2011 |
| JP | 04-029063 | 1/1992 |
| JP | 2003-056452 | 2/2003 |
| JP | 2003-254225 | 9/2003 |
| JP | 2005-256829 | 9/2005 |
| JP | 2009-127448 | 11/2009 |
| JP | 2012-092851 | 5/2012 |
| KR | 101173365 B1 | 10/2012 |
| KR | 20130000541 | 1/2013 |
| WO | WO 00/15961 A1 | 3/2000 |
| WO | WO 01/16482 A1 | 3/2001 |
| WO | WO 2007/005687 A1 | 1/2007 |
| WO | WO 2008/113349 A2 | 9/2008 |
| WO | WO 2009/080316 A2 | 7/2009 |
| WO | WO 2009/143849 A2 | 12/2009 |
| WO | WO 2010/100237 A2 | 9/2010 |
| WO | WO 2011/004262 A1 | 1/2011 |
| WO | 2011088835 A2 | 7/2011 |
| WO | WO 2011/147422 A2 | 12/2011 |
| WO | WO 2012/007058 A1 | 1/2012 |
| WO | WO 2012/055418 A1 | 5/2012 |
| WO | WO 2012/072084 A1 | 6/2012 |
| WO | WO 2013/014015 A1 | 1/2013 |
| WO | WO 2013/014080 A2 | 1/2013 |
| WO | WO 2013/014082 A2 | 1/2013 |
| WO | 2013060722 A1 | 5/2013 |

* cited by examiner

ROTOR BLADE FENCE FOR A WIND TURBINE

FIELD OF THE INVENTION

The present invention relates generally to wind turbine rotor blades, and more particularly to a rotor blade fence for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. The rotor blades capture kinetic energy of wind using known airfoil principles. For example, rotor blades typically have a cylindrical blade root that transitions to an airfoil shape towards a blade tip. The cross-sectional profile of the airfoil shape is such that, during operation, air flows from a leading edge to a trailing edge of the blade producing a pressure difference between a pressure side surface and a suction side surface, thereby creating a lift force. The lift force generates torque on the main rotor shaft, which is geared to a generator for producing electricity.

Ideally, the air flow is attached to the suction side surface from the leading edge to the trailing edge. However, when the angle of attack of the air flow exceeds a certain critical angle, the flow does not reach the trailing edge, but leaves the suction side surface at a flow separation line, which decreases potential energy production. Flow separation depends on a number of factors, such as incoming air flow characteristics (e.g. Reynolds number, wind speed, in-flow atmospheric turbulence) and characteristics of the blade (e.g. airfoil sections, blade chord and thickness, twist distribution, pitch angle, etc.). For example, flow separation tends to be more prevalent near the cylindrical blade root due to the relatively great angle of attack of the blade flow surfaces in this region as compared to the blade tip. The detached-flow region also leads to an increase in drag force, mainly due to an increase in profile wake and the related pressure drag (i.e. the attached flow state creates less pressure difference in the flow direction than the detached flow state). Hence, in order to increase the energy conversion efficiency during normal operation of the wind turbine, it is desired to increase the lift force of the blades while decreasing the drag force. To this purpose, it is advantageous to increase the attached-flow region and to reduce the detached-flow region by moving flow separation nearer the trailing edge of the blade.

It is known in the art to change the aerodynamic characteristics of wind turbine blades by adding dimples, protrusions, or other structures on the surface of the blade. These structures are often referred to as "vortex generators" and serve to create local regions of turbulent airflow over the surface of the blade as a means to preclude flow separation and thus optimize aerodynamic airflow around the blade contour. Such vortex generators, dimples, protrusions, and other similar features on the surface of the blade may be generally referred to herein as "airflow modifying elements." Conventional vortex generators typically consist of a base having one or more raised surfaces and are attached to the suction side of the blade using adhesive tape. However, such airflow modifying elements must be properly aligned and may increase installation time and costs.

It is also known in the art to install blade fairings, flaps and/or other suitable extensions to the rotor blade, such as the cylindrical blade root, to improve aerodynamic characteristics of the blade in these areas. Such additions are typically mounted on the rotor blades to increase the rotor blade surface area and/or to improve aerodynamic performance and thus increase the lift. However, such additions must have a suitable thickness to withstand buckling and therefore add weight to the rotor blade that can negatively impact the performance of the rotor blade and the wind turbine in general. Further, the additions and/or fairings increase loading of the rotor blade and the downstream wind turbine components. In addition, manufacturing of the fairings can be expensive.

Thus, an improved rotor blade assembly for a wind turbine that addresses the aforementioned problems would be advantageous. For example, a rotor blade assembly that includes a blade root extension with one or more blade fences configured to improve aerodynamic performance of the rotor blade would be desired in the art.

BRIEF DESCRIPTION OF THE INVENTION

Aspects and advantages of the invention will be set forth in part in the following description, or may be obvious from the description, or may be learned through practice of the invention.

In accordance with aspects of the invention, a rotor blade assembly for a wind turbine is disclosed. The rotor blade assembly includes a rotor blade extending from a blade root to a blade tip. The rotor blade has a pressure side surface and a suction side surface. The pressure side surface and the suction side surface each extend between a leading edge and a trailing edge. The assembly also includes a blade root extension configured to attach to one of the pressure side surface or the suction side surface of the rotor blade adjacent to the blade root. The blade root extension includes at least one blade fence and at least one airflow modifying element. The blade fence extends between a proximal end and a distal end in a generally chord-wise direction. The proximal end is configured to attach to the rotor blade such that the distal end can remain free and spaced apart from the rotor blade. The airflow modifying element is configured at the proximal end of the blade fence. As such, the blade root extension is configured to improve aerodynamic performance and stiffness of the rotor blade.

In another embodiment, the blade root extension may include a plurality of blade fences and a plurality of airflow modifying elements spaced apart in a span-wise direction. In still another embodiment, the blade root extension may include a panel element configured to connect the plurality of blade fences on a blade-side of the plurality of blade fences. In one embodiment, the panel element may be a separate material configured on the blade-side of the plurality of blade fences. In an alternative embodiment, each of the plurality of blade fences may include one or more flanges located on the blade-side of the plurality of fences. As such, each of the flanges may be configured to connect to adjacent flanges of adjacent blades fence to form the panel element.

In yet another embodiment, each of the plurality of blade fences may include an extension portion at the distal ends of each of the blade fences. In still another embodiment, the plurality of blade fences may form a corrugated profile with the panel element. In a further embodiment, the blade root extension may define an extended suction side surface, an extending pressure side surface, or a combination thereof. In still a further embodiment, the blade root extension may define an extended trailing edge, an extending leading edge, or a combination thereof when attached to the rotor blade.

In another embodiment, each of the plurality of blade fences and corresponding airflow modifying element(s) may have one of a Y-shape, H-shape, or any other suitable shape configuration. In another embodiment, the proximal end of the blade fence may be fixed to the rotor blade at a location less than or equal to a 50% chord length from a leading edge of the rotor blade. In addition, each blade fence and corresponding airflow modifying element(s) may have a constant height in a chord-wise direction or may have a varying height in the chord-wise direction.

In another aspect, a rotor blade assembly for a wind turbine is disclosed. The rotor blade assembly includes a rotor blade extending from a blade root to a blade tip and a blade root extension. The rotor blade has a pressure side surface and a suction side surface. The pressure side surface and the suction side surface each extend between a leading edge and a trailing edge. The blade root extension includes a plurality of blade fences. Each of the plurality of blade fences extends between a proximal end and a distal end in a chord-wise direction. The proximal ends of each of the plurality of blade fences are fixed to the rotor blade and spaced apart in a span-wise direction. The distal ends of the plurality of the blade fences define one of an extended trailing edge or an extended leading edge, wherein the blade root extension is configured to improve aerodynamic performance of the rotor blade.

In still a further aspect, a rotor blade assembly for a wind turbine is disclosed. The rotor blade assembly includes a rotor blade extending from a blade root to a blade tip. The rotor blade has a pressure side surface and a suction side surface. The pressure side surface and the suction side surface each extend between a leading edge and a trailing edge. The assembly also includes a blade root extension configured to attach to a hub of the wind turbine. The blade root extension includes at least one blade fence and at least one airflow modifying element. The blade fence extends between a proximal end and a distal end in a generally chord-wise direction. The airflow modifying element is configured at the proximal end of the blade fence. Accordingly, the blade root extension is configured to improve aerodynamic performance and stiffness of the rotor blade. The blade root extension may further be configured in accordance with any one of the embodiments set forth above.

Still further aspects of the invention encompass a wind turbine having a tower, a nacelle, and at least one rotor blade assembly. The rotor blade assembly may be configured in accordance with any one of the embodiments set forth above. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
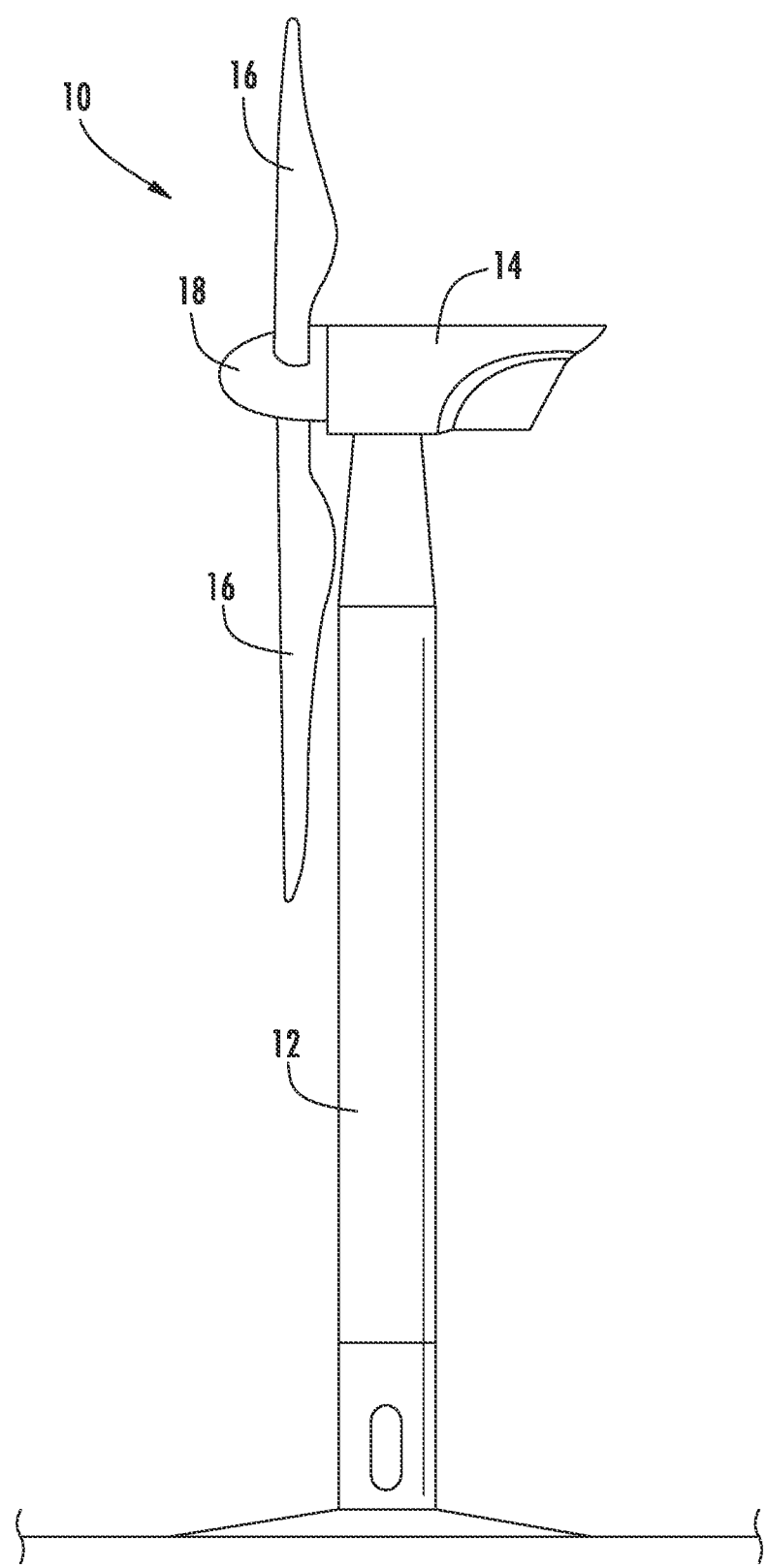
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a blade fence and assembly for a rotor blade of a wind turbine. The blade fence and/or corresponding assembly may be configured to attach to one or more rotor blades and/or the hub of a wind turbine. Further, the blade fence and/or corresponding assembly may be configured on either the pressure side surface or the suction side surface of the rotor blade near a blade root or a blade tip. Further, the blade fence and/or corresponding assembly may be configured to form an extended leading edge and/or an extended trailing edge of the rotor blade. In addition, the blade fence typically includes at least one airflow modifying element connected thereto. Further, the blade fence generally extends in a first chord-wise direction between a proximal end and a distal end. The term "proximal end" is generally understood to mean the end of the blade fence that is closest to the rotor blade, whereas the term "distal end" is the opposite end that is farther from the rotor blade. The airflow modifying element(s) is typically configured at the proximal end of the blade fence. In addition, the blade fence and corresponding airflow modifying element(s) have a Y-shape or an H-shape configuration. The blade fence may also be referred to herein as part of a blade root extension, which is meant to encompass both a single blade fence and/or a plurality of blade fences, as well as any other optional features of the blade fence as described here. As such, the terms "blade fence" and "blade root extension" may sometimes be used interchangeably.

The blade fence and/or blade root extension provides many advantages not present in the prior art. For example, the blade root extension provides improved aerodynamic performance of the blade root by giving the blade root an enhanced aerodynamic shape over the standard cylindrical shape as previously mentioned. Further, the blade fence(s) has an improved stiffness over conventional fairings and/or additions due to the rigidity and structural characteristics of the blade fence(s). For example, as will be discussed later, the fences can be easily designed with a suitable height to avoid buckling, while also minimizing additional weight that is added to the rotor blade. Additionally, the blade root extension is easier to manufacture than conventional three-dimensional fairings.

Referring now to the drawings, FIG. 1 illustrates a wind turbine 10 according to the present disclosure. The wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
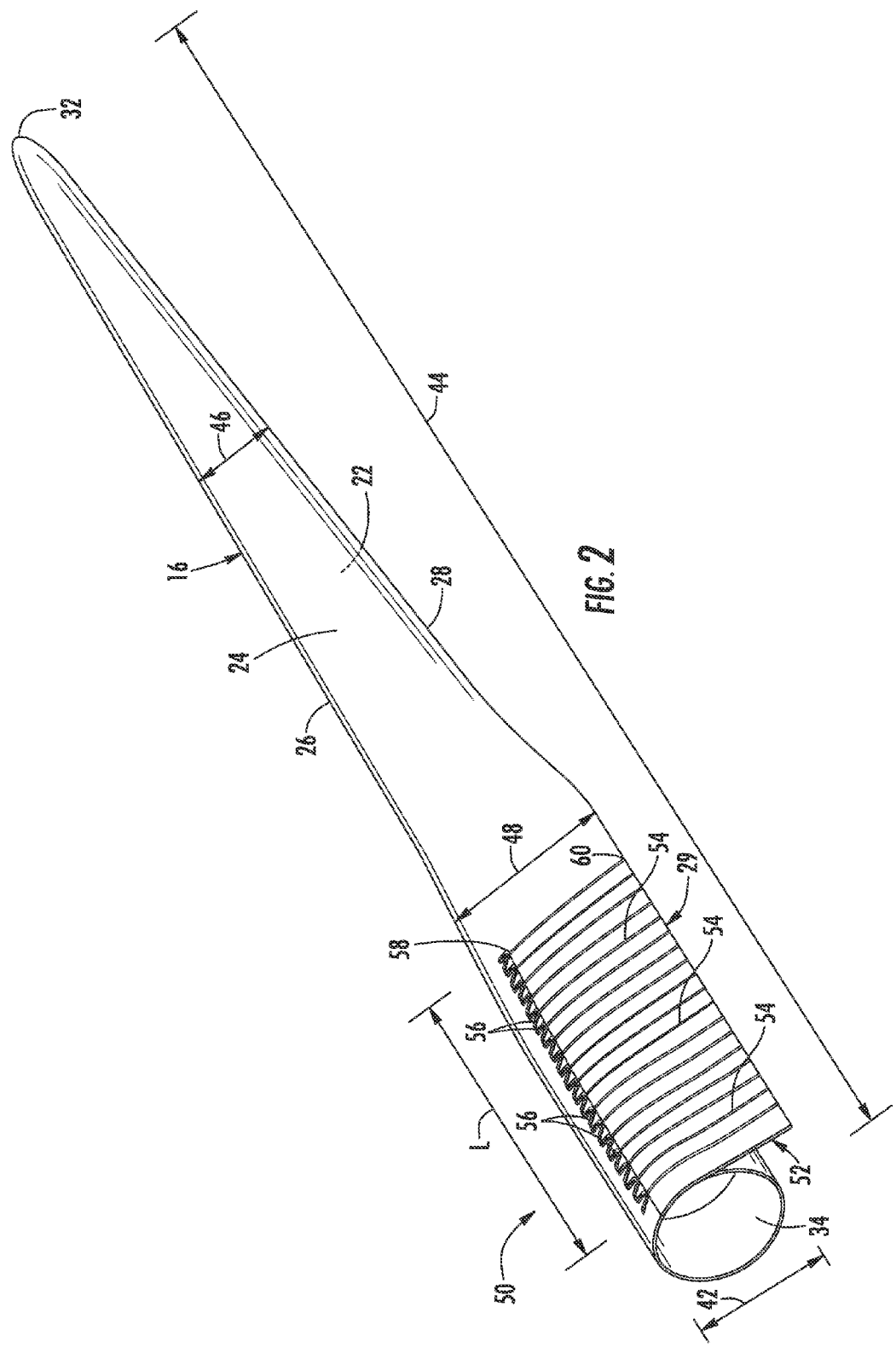
FIG. 2 illustrates a perspective view of one embodiment of a rotor blade assembly according to the present disclosure.

Referring now to FIG. 2, the rotor blade 16 of FIG. 1 is illustrated according to the present disclosure. As shown, the rotor blade 16 has exterior surfaces defining a pressure side surface 22 and a suction side surface 24. The pressure side surface 22 and the suction side surface 24 may each extend between a leading edge 26 and a trailing edge 28. One or more of the pressure side surface 22, the suction side surface 24, the leading edge 26 and/or the trailing edge 28 may be generally aerodynamic surfaces having generally aerodynamic contours, as is generally known in the art. For example, FIGS. 2-10 illustrate various embodiments of the rotor blade 16 wherein the pressure side surface 22, the suction side surface 24, the leading edge 26, and the trailing edge 28 have generally aerodynamic surfaces having generally aerodynamic contours and thus forming a typically known airfoil cross-sectional profile. Further, the exterior surfaces may extend between a blade tip 32 and a blade root 34 in a generally span-wise direction. In addition, the blade root 34 has a generally cylindrical shape to provide a suitable structural connection to the rotatable hub 18.

Figure 6:
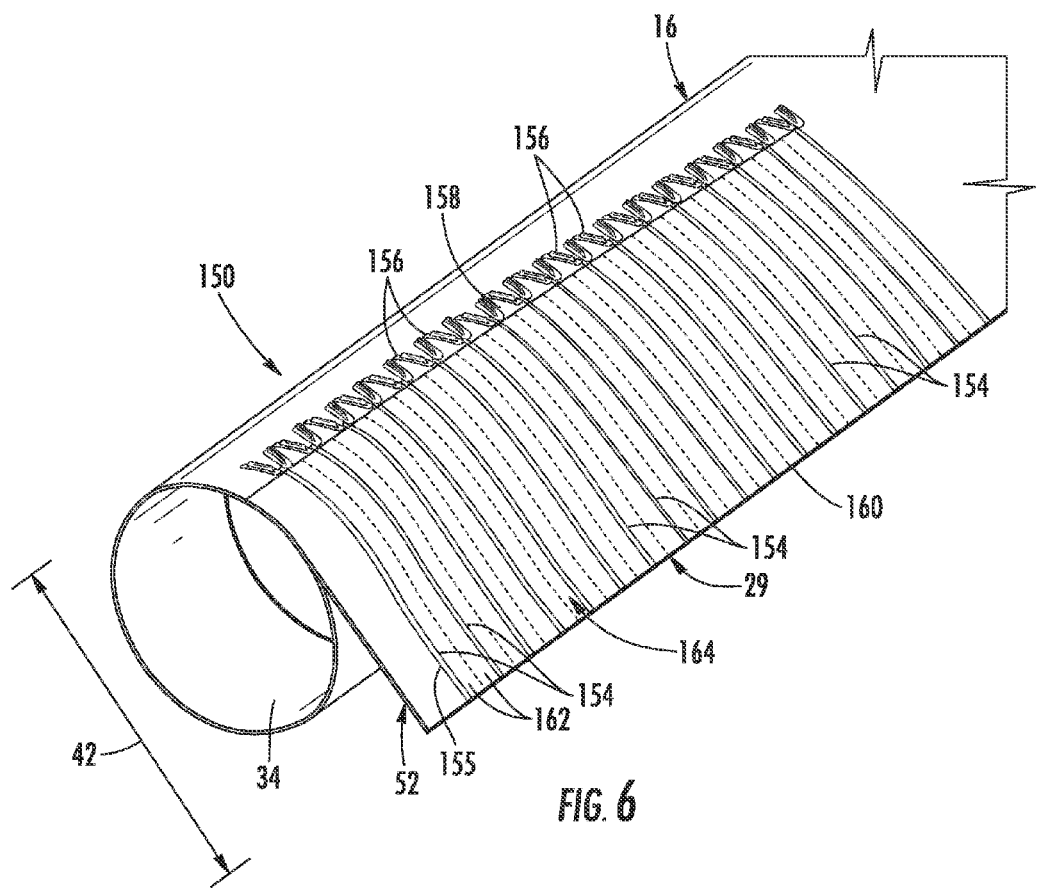
FIG. 6 illustrates a perspective view of another embodiment of a rotor blade assembly according to the present disclosure.

The rotor blade 16 may further define a chord 42 and a span 44 extending in the chord-wise and span-wise directions, respectively. As shown in FIGS. 2 and 6, the chord 42 may vary throughout the span 44 of the rotor blade 16. Thus, as discussed below, a local chord 46 may be defined for the rotor blade 16 at any point on the rotor blade 16 along the span 44. Further, the rotor blade 16 may define a maximum chord 48, as shown. The term "span-wise" is generally understood to mean substantially parallel to the span 44 of the rotor blade 16. The term "chord-wise" is generally understood to mean substantially parallel to the chord 42 of the rotor blade 16.

Figure 3:
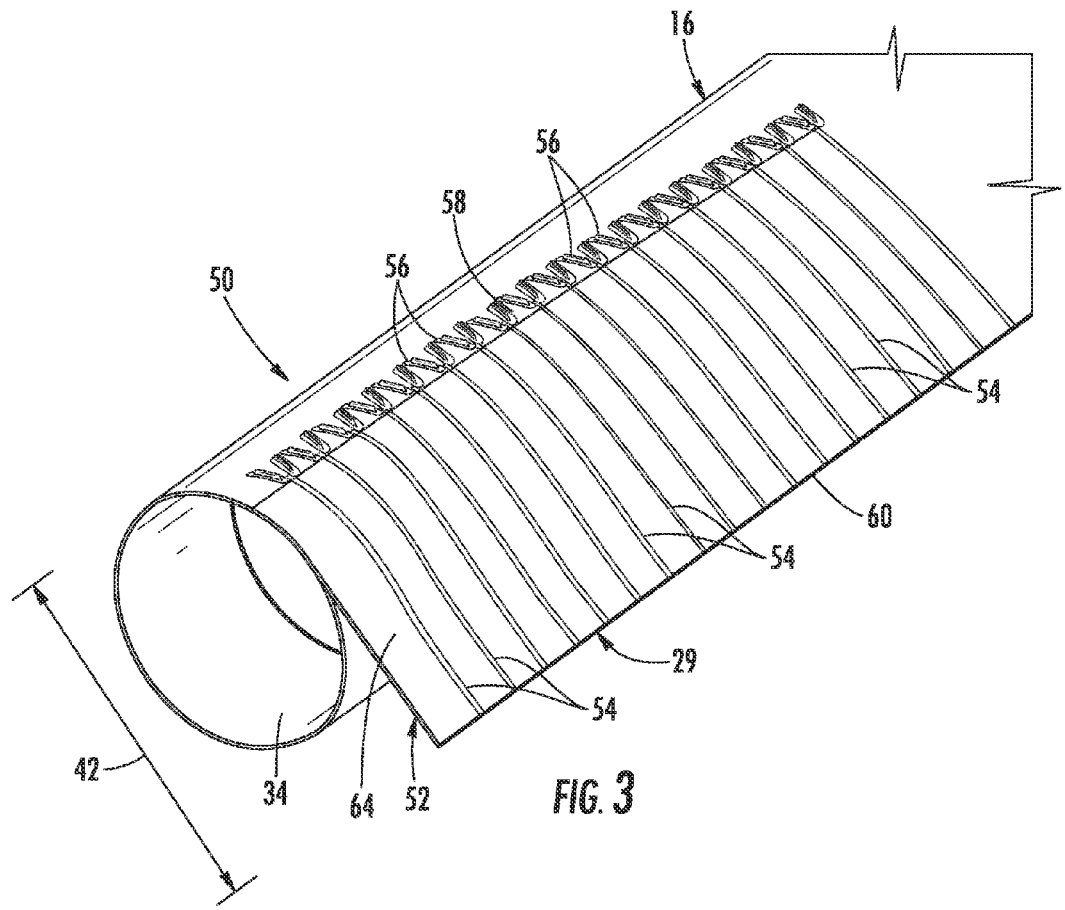
FIG. 3 illustrates a detailed perspective view of the rotor blade assembly of FIG. 2.
Figure 4:
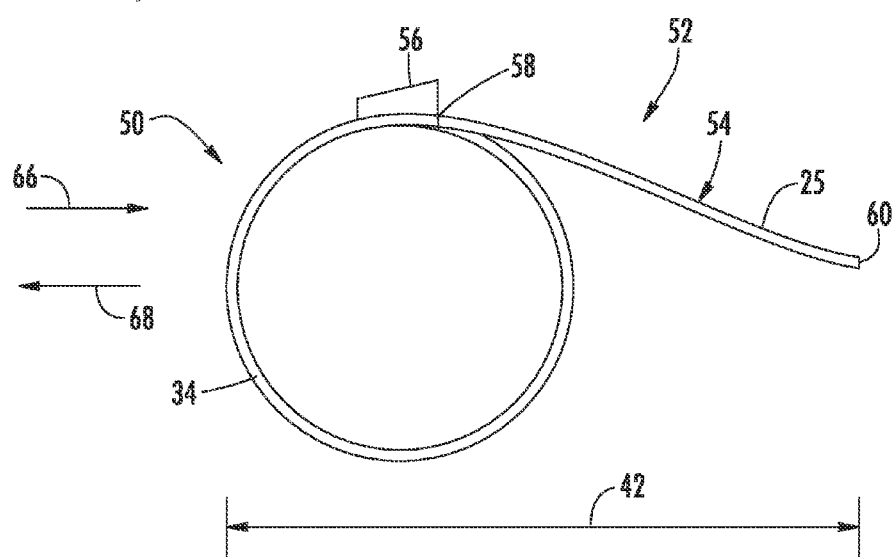
FIG. 4 illustrates a cross-sectional view of the rotor blade assembly of FIG. 2.
Figure 13:
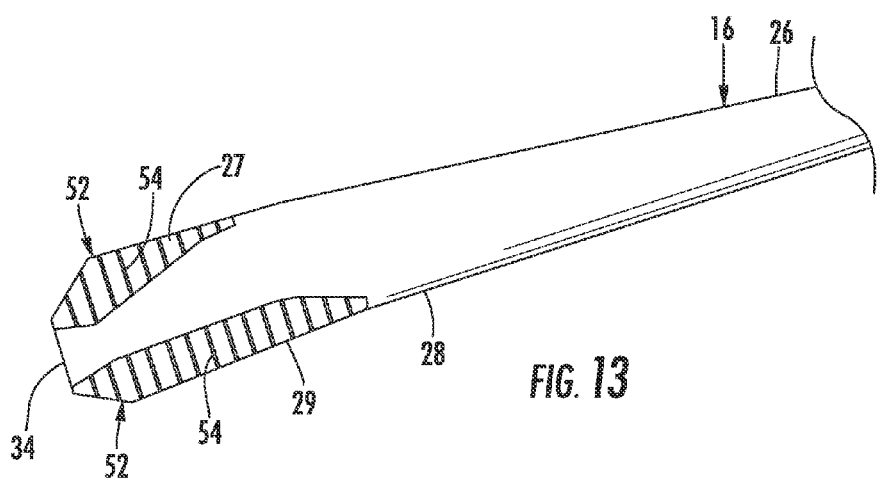

Referring generally to the figures, the present disclosure may further be directed to a rotor blade assembly 50 including the rotor blade 16 as described above and a blade root extension 52. The blade root extension 52 may be configured at any suitable location on the wind turbine 10. For example, in one embodiment, the blade root extension 52 may be configured to attach to the hub 18 of the wind turbine 10. Alternatively, the blade root extension 52 may be configured to attach to the rotor blade 16. In the latter embodiment, the blade root extension 52 may be configured on either of the pressure side surface 22 or the suction side surface 24. In addition, the blade root extension 52 is typically configured near the blade root 34, but may also be located near the blade tip 32. For example, as illustrated in FIGS. 2-4, the blade root extension 52 is located on the suction side surface 24 of the rotor blade 16 near the blade root 34. As such, the blade root extension 52 is configured to improve the aerodynamic performance of the cylindrical blade root 34. In further embodiments as shown in FIGS. 2, 3, 6, 7, and 13, the blade root extension 52 may define an extended trailing edge 29. Thus, the blade root extension 52 may, in these embodiments, be spaced from the leading edge 26 in the chord-wise direction. In additional embodiments, as shown in FIG. 13, the blade root extension 52 may define an extended leading edge 27. Thus, the blade root extension 52 may in these embodiments be spaced from the trailing edge 28 in the chord-wise direction. In additional embodiments, the blade root extension 52 may further extend through any suitable span-wise portion of the rotor blade 16, and may thus have any suitable length relative to the span 44. For example, as shown in FIGS. 2 and 6, the blade root extension 52 may extend from the blade root 34 towards the tip 32 a length L. Alternatively, the blade root extension 52 may be spaced from the blade root 34, for example, closer to the blade tip 32.

Figure 8:
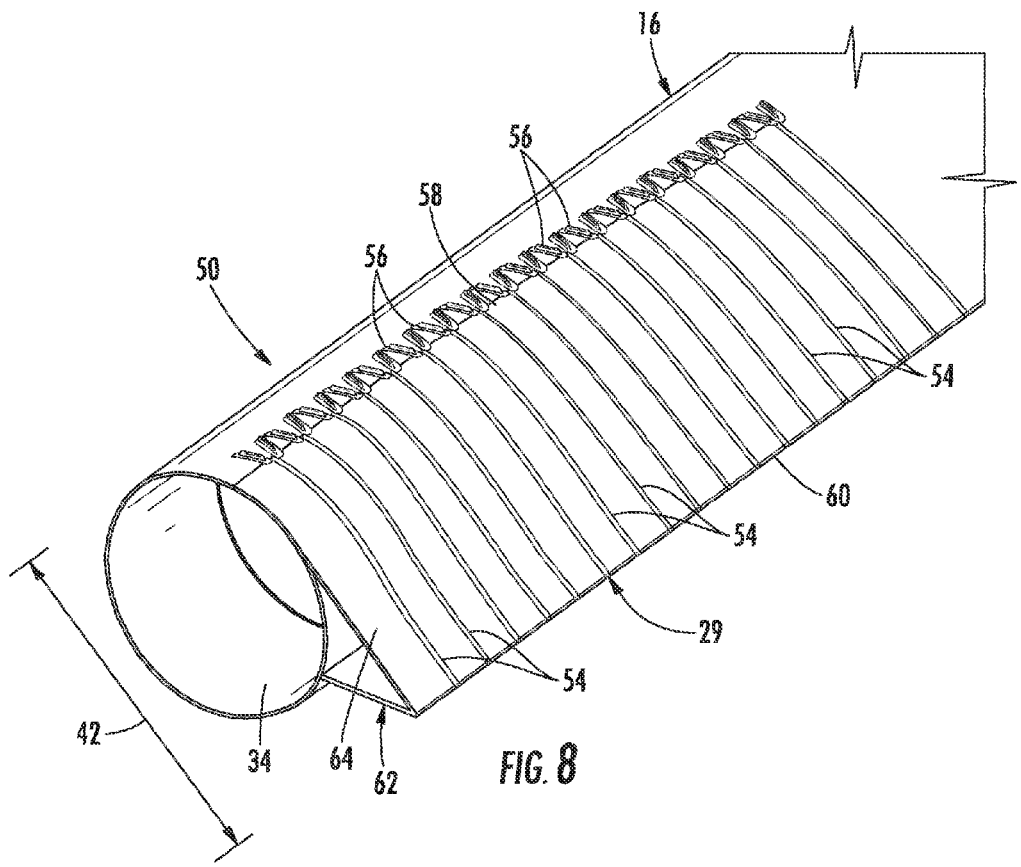
FIG. 8 illustrates a partial perspective view of another embodiment of a rotor blade assembly according to the present disclosure.

The blade root extension 52 or any portion thereof may, in some embodiments, have a generally aerodynamic contour. For example, as shown in FIGS. 4 and 8, the blade root extension 52 may have a generally aerodynamic contour. Further, in some embodiments, the blade root extension 52 may define a generally continuous aerodynamic surface with the pressure side surface 22 or suction side surface 24 of the rotor blade 16. A generally continuous aerodynamic surface is a surface that has a generally continuous aerodynamic contour. Thus, when two surfaces define a generally continuous aerodynamic surface, there is relatively little interruption in the aerodynamic contour at the intersection of the two surfaces. Such continuous aerodynamic contour may particularly occur in embodiments wherein the blade root extension 52 is fixed. In alternative embodiments, the blade root extension 52, or any portions thereof, may have any other suitable contours, which may be planer, curvi-planer, or otherwise.

As mentioned, the blade root extension 52 includes at least one blade fence 54 and at least one airflow modifying element 56. In a further embodiment, the blade root extension 52 includes a plurality of blade fences 54 and a plurality of airflow modifying elements 56. The blade fence(s) 54 typically extend in a first chord-wise direction between a proximal end 58 and a distal end 60. In one embodiment, the blade fence(s) 54 is secured and/or fixed to the rotor blade 16 at the proximal end 58. More specifically, the proximal ends 58 of each of the plurality of blade fences 54 may be fixed to the rotor blade 16 at a location less than or equal to a 50% chord length from the leading edge 26 of the rotor blade 16. In a further embodiment, the proximal ends 58 may be fixed to the rotor blade at a location greater than or equal to 50% chord length from the leading edge 26 of the rotor blade 16. In addition, the proximal ends 58 may, in some embodiments, be mounted to the rotor blade 16 through the use of, for example, a suitable adhesive or a suitable brazing or welding technique, or may be mounted through the use of, for example, suitable mechanical fasteners such as screws, nails, rivets, nut-bolt combinations, etc. Accordingly, the corresponding distal ends 60 of the blade fences 54 are typically free and spaced apart from the rotor blade 16 when the proximal ends 58 are fixed to the rotor blade 16. For example, as shown in FIGS. 2-4 and 6-8, the distal ends 60 may be spaced apart from the blade root 34 in a first chord-wise direction (along the chord 42 or local chord 46). In a further embodiment, the distal ends 60 may include an extension portion 62 that connects each of the distal ends 60 to the rotor blade 16, as will be discussed in more detail below.

Figure 12:
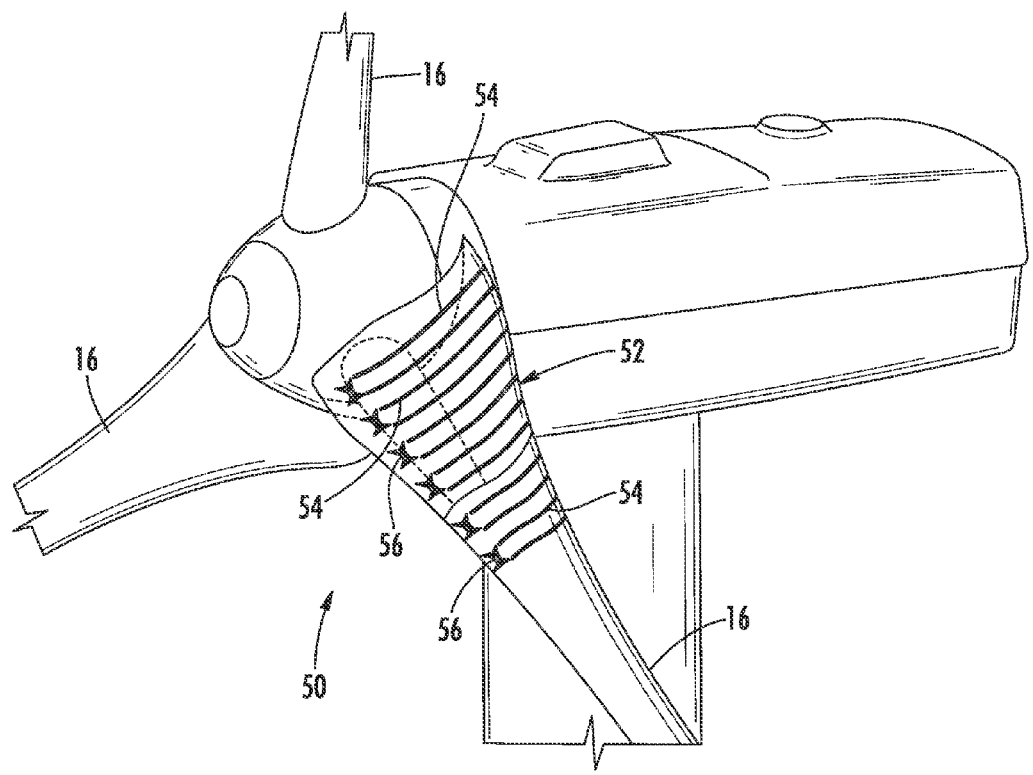
FIG. 12 illustrates a perspective view of another embodiment of a rotor blade assembly according to the present disclosure; and, FIG. 13 illustrates a perspective view of still another embodiment of a rotor blade assembly according to the present disclosure.

In an additional embodiment, the blade root extension 52 may be secured to the hub 18, rather than, or in addition to the rotor blade 16. For example, as shown particularly in FIG. 12, the blade root extension 52 is attached to the hub 18 such that the extension 52 remains stationary and the blade 16 is free to rotate or pitch about a pitch axis. Additionally, the blade fences 54 may be configured on a surface of the rotor blade 16, as well as being part of the blade extension 52, such that one or more of the blade fences 54 remain stationary and one or more of the blade fences 54 rotate with the blade 16 when the blade 16 is pitched.

Figure 10:
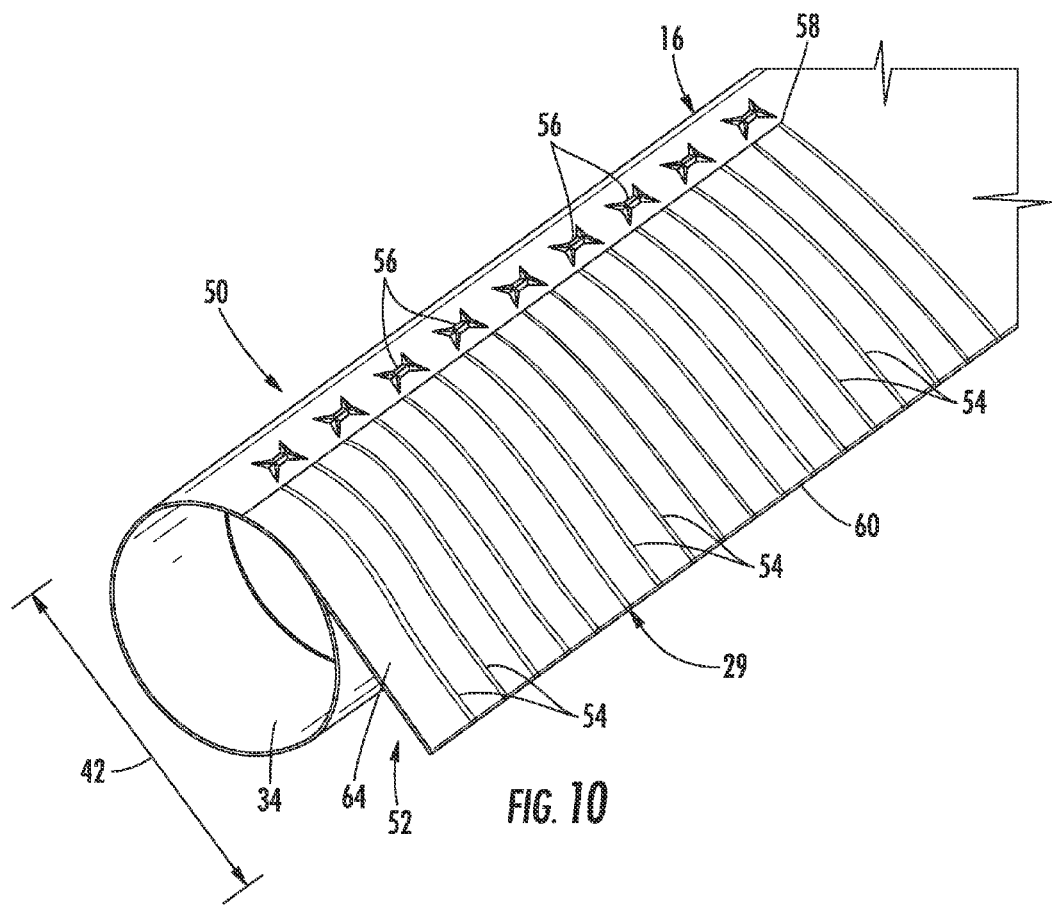
FIG. 10 illustrates a partial perspective view of another embodiment of a rotor blade assembly according to the present disclosure.
Figure 11:
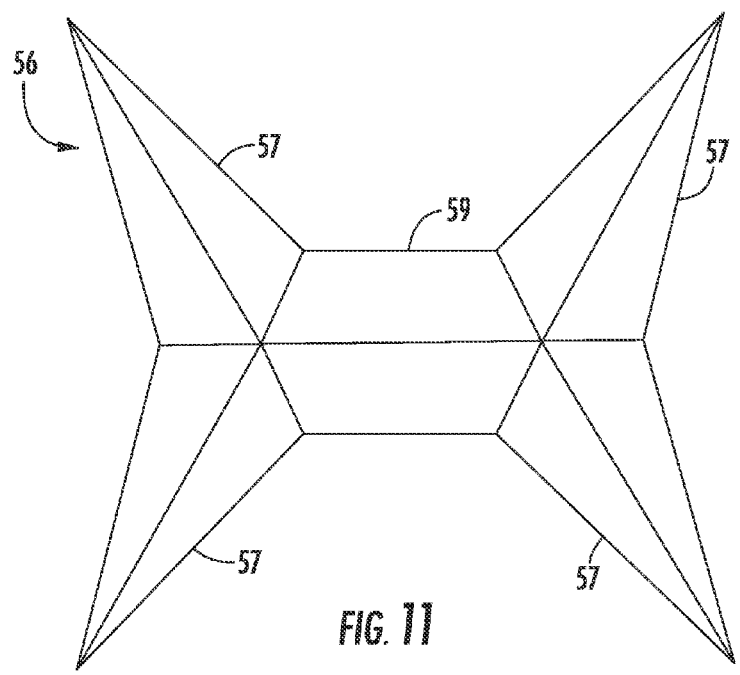
FIG. 11 illustrates one embodiment of an airflow modifying element according to the present disclosure.

In further embodiments, the airflow modifying element(s) 56 may be configured at either end of the blade fence 54. For example, in the illustrated embodiment, the airflow modifying elements 56 are located at the proximal ends 58 of the blade fences 54. In still further embodiments, the airflow modifying elements 56 may be located at both ends 58, 60 of the blade fences 54 or at any location between the ends 58, 60. Further, any number of airflow modifying elements 56 may be configured with each blade fence 54. For example, as shown in FIGS. 2-6, at least two airflow modifying elements 56 are configured at each of the proximal ends 58 of the blade fences 54. Moreover, it should be understood that each blade fence 54 and corresponding airflow modifying element(s) 56 may form any suitable shape configuration. For example, as shown in FIGS. 2-6, the two airflow modifying elements 56 and corresponding blade fence 54 form a generally Y-shaped configuration. In a further embodiment, as shown in FIGS. 10 and 11, the airflow modifying element 56 and corresponding blade fence(s) 54 have a generally H-shaped configuration. In still further embodiments, each blade fence 54 and corresponding airflow modifying element(s) 56 of the blade root extension 52 may form the same shape configuration or may form different shape configurations than adjacent blade fences 54 of the blade root extension 52.

It should also be understood that the airflow modifying elements 56 described herein may each individually have any suitable shape configuration. For example, as shown in FIGS. 2-6, the airflow modifying elements 56 have a base with a raised surface. Alternatively, as shown in FIGS. 10 and 11, the airflow modifying elements 56 have a generally three-dimensional H-shaped configuration. More specifically, the airflow modifying element 56 of FIG. 11 has a plurality of arm portions connected to a central body portion so as to form an "H". In another embodiment, the airflow modifying element may have a star-shaped configuration. Further, airflow modifying elements may have any suitable fin, wedge-type, or any other suitable shape known in the art or any combinations thereof. Further, the airflow modifying elements 56 may include one or more vortex generators. In still further embodiments, each of the blade fences 54 may include similarly shaped airflow modifying elements 56 or may include differently shaped airflow modifying elements 56.

Figure 7:
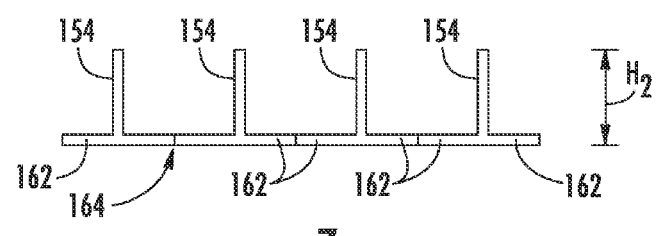
FIG. 7 illustrates a side view of the blade fence of FIG. 2.

Referring generally still to the figures, the blade root extension 52 may also include a panel element 64. The panel element 64 is configured to connect each of the blade fences 54 on a blade-side 55 of the plurality of blade fences 54. In one embodiment, as shown in FIGS. 3 and 4, the panel element 64 may be a separate material configured on the blade-side 55 of the plurality of blade fences 54. For example, the panel element 64 may be any suitable cloth, fabric, and/or non-structural element, such as a sail-cloth material, configured to connect the blade fences 54 in a generally span-wise direction. In an alternative embodiment, as shown in FIGS. 6 and 7, each of the blade fences 154 may include one or more flanges 162 located on the blade-side 155 of the plurality of fences 154. As such, each of the flanges 162 may be configured to connect to adjacent flanges 162 of adjacent blades fences 154 to form the panel element 164.

In a further embodiment, the plurality of the blade fences 54 forms a corrugated profile with the panel element 64, 164. In a further embodiment, the corrugated profile may blocks flow in a span-wise direction. By blocking the span-wise flow, the fences 54, 154 prevent flow separation from spreading further to outboard areas of the rotor blade 16. In a further embodiment, the panel element 64, 164 and blade fences 54, 154 define an extended suction side surface 25 of the rotor blade 16. For example, in one embodiment, the plurality of blade fences 54 and corresponding airflow modifying elements 56 may be aligned in a generally span-wise direction and connected via the panel element 64, 164 to form the blade root extension 52, 152. In such an embodiment, the blade root extension 52, 152 can be secured to the rotor blade 16 as a single structure, thereby simplifying installation. In an alternative embodiment, however, the panel element 64 may be eliminated altogether such that each blade fence 54 and corresponding airflow modifying element 56 is installed onto the rotor blade 16 separately.

Figure 9:
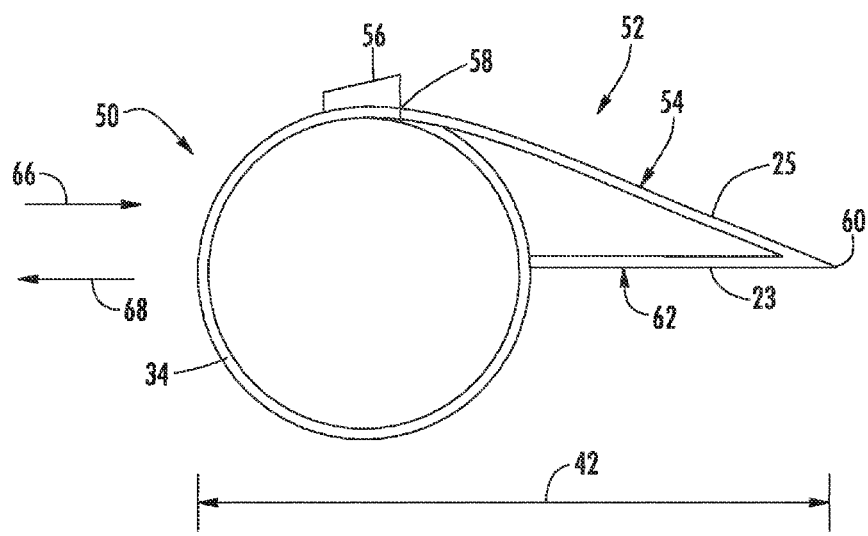
FIG. 9 illustrates a cross-sectional view of the rotor blade assembly of FIG. 6.

As mentioned and referring particularly to the embodiment of FIGS. 8-9, each blade fence 54 may also include an extension portion 62 configured at the distal end of each blade fence 54. More specifically, the extension portion 62 may be configured at the distal end 60 of the blade fence 54 in a second chord-wise direction opposed to the first chord-wise direction. Optionally, the panel element 64 may be configured to extend within the extension portions 62 so as to define an extended pressure side surface 23 of the rotor blade 16. By extending the pressure side surface 22 and the suction side surface 24 of the rotor blade 16 as described herein, the blade root extension 52 may augment the lift capacity, reduce the drag, and/or augment the lift to drag ratio of the rotor blade 16 when in a fixed position by covering at least a portion of the cylindrical blade root 34.

Figure 5:
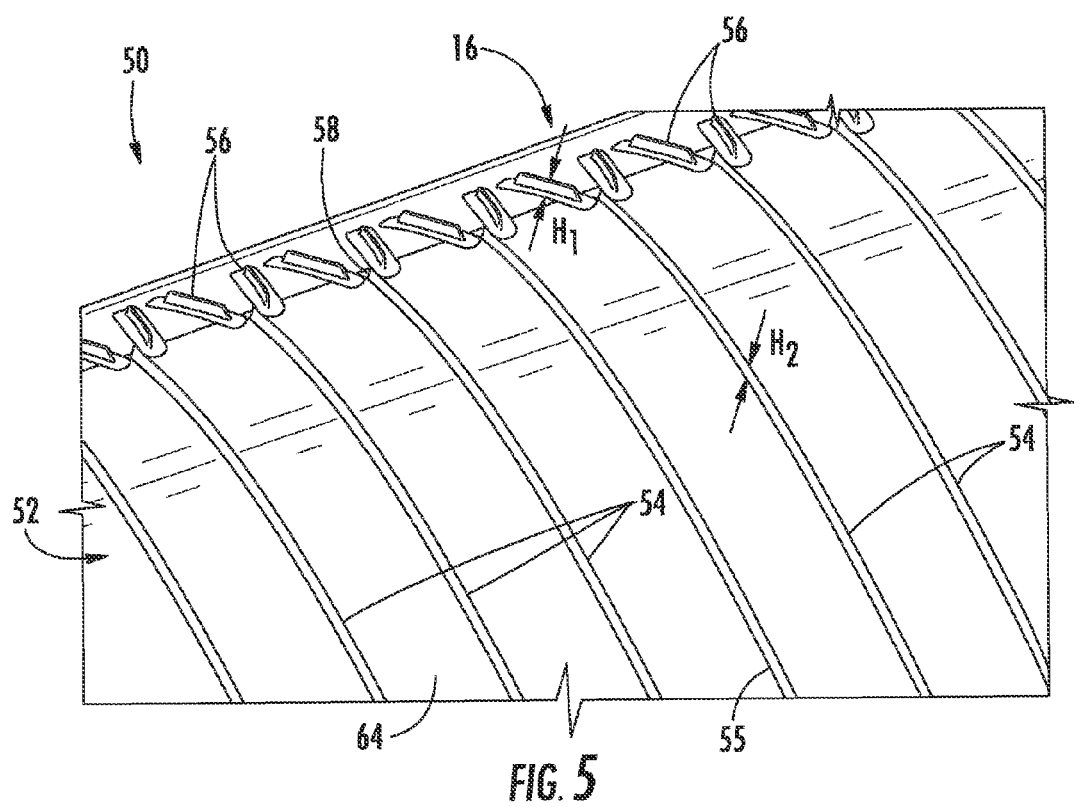
FIG. 5 illustrates another detailed perspective view of the rotor blade assembly of FIG. 2.

Referring now particularly to FIGS. 5 and 7, a height $H_1$ of the airflow modifying elements 56 and a height $H_2$ of the blade fences 54 is illustrated. In one embodiment, the height $H_2$ of the blade fences 54 is suitable such that it withstands buckling. In addition, the height $H_2$ may be constant in the chord-wise direction because it typically experiences a less severe increase in boundary layer thickness than on a conventional cylindrical cross-section. In a further embodiment, the height $H_1$ of the airflow modifying elements 56 and the height $H_2$ of the blade fences 54 are substantially equal. For example, in one particular embodiment, the height $H_1$ of the airflow modifying elements 56 and the height $H_2$ of the blade fences 54 ranges between approximately 10 millimeters (mm) and 400 mm. For example, in one embodiment, $H_1$ and $H_2$ are approximately equal to 50 mm. In a further embodiment, the height $H_1$ of the airflow modifying elements 56 and the height $H_2$ of the blade fences 54 is less than 10 mm or more than 400 mm. In an alternative embodiment, the height $H_1$ of the airflow modifying elements 56 is greater than the height $H_2$ of the blade fences 54. In still a further embodiment, the height $H_1$ of the airflow modifying elements 56 is less than the height $H_2$ of the blade fences 54.

It should also be understood that the blade fence(s) 54, 154 according to the present disclosure may be formed from any suitable materials. For example, in some embodiments, the blade fence(s) 54, 154 may be formed from plastic, thermoplastic, metal, fiberglass, or any other suitable material. Further, the material utilized to form the blade fence(s) 54, 154 may preferably be lightweight, and may further preferably be suitably rigid to maintain its structure during use in a wind turbine 10.

Thus, the present disclosure is advantageously directed to a blade root extension 52, 152 and/or blade fence 54, 154 and corresponding assembly 50, 150 having improved features. For example, the rotor blade assembly 50, 150 as described herein is a unique structure that provides the combination of improved aerodynamic performance of the rotor blade 16 and improved structural integrity and/or stiffness without negatively impacting the weight of the rotor blade 16. Further, the blade root extension 52, 152 as described herein may reduce the weight associated with similarly sized and previously known blade root additions, while providing similar lift augmentation, drag reduction, and/or lift to drag ratio augmentation and/or other beneficial features to rotor blades 16. Such blade root extensions 52, 152 may further be retrofitted to existing rotor blade 16, or may be utilized in newly manufactured rotor blades 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
    a rotor blade extending from a blade root to a blade tip, the rotor blade having a pressure side surface and a suction side surface, the pressure side surface and the suction side surface each extending between a leading edge and a trailing edge; and,
    a blade root extension configured to attach to one of the pressure side surface or the suction side surface of the rotor blade adjacent to the blade root, the blade root extension comprising a plurality of blade fences and a plurality of airflow modifying elements spaced apart in a span-wise direction, each of the plurality of blade fences extending between a proximal end and a distal end in a chord-wise direction, the proximal ends configured to attach to the rotor blade such that the distal ends remain free and spaced apart from the rotor blade, the airflow modifying elements configured at the proximal ends of the blade fences,
    wherein the blade root extension is configured to improve aerodynamic performance of the rotor blade.

2. The rotor blade assembly of claim 1, wherein the blade root extension further comprises a panel element configured to connect the plurality of blade fences on a blade-side of the plurality of blade fences.

3. The rotor blade assembly of claim 1, wherein each of the plurality of blade fences further comprise one or more flanges located on a blade-side of the plurality of fences, wherein each of the flanges are configured to connect to adjacent flanges of adjacent blades fence to form a panel element.

4. The rotor blade assembly of claim 1, wherein each of the plurality of blade fences further comprise an extension portion configured at the distal ends of each of the blade fences.

5. The rotor blade assembly of claim 1, wherein the plurality of the blade fences form a corrugated profile.

6. The rotor blade assembly of claim 1, wherein the blade root extension defines at least one of an extended suction side surface or an extended pressure side surface.

7. The rotor blade assembly of claim 1, wherein the blade root extension defines one of an extended trailing edge or an extended leading edge when attached to the rotor blade.

8. The rotor blade assembly of claim 1, wherein each of the plurality of blade fences and corresponding airflow modifying element has one of a Y-shape or an H-shape.

9. The rotor blade assembly of claim 1, wherein the proximal end of the blade fence is fixed at a location less than or equal to a 50% chord length from the leading edge of the rotor blade.

10. The rotor blade assembly of claim 1, wherein the blade fence and the airflow modifying element have a constant height in the chord-wise direction.

11. A rotor blade assembly for a wind turbine, the rotor blade assembly comprising:
    a rotor blade extending from a blade root to a blade tip, the rotor blade having a pressure side surface and a suction side surface, the pressure side surface and the suction side surface each extending between a leading edge and a trailing edge; and,
    a blade root extension comprising a plurality of blade fences and a plurality of airflow modifying elements spaced apart in a span-wise direction, each of the plurality of blade fences extending between a proximal end and a distal end in a chord-wise direction, the proximal ends of each of the plurality of blade fences fixed to the rotor blade and spaced apart in a span-wise direction such that the distal ends remain free and spaced apart the rotor blade, the distal ends of the plurality of the blade fences defining one of an extended trailing edge or an extended leading edge,
    wherein the blade root extension is configured to improve aerodynamic performance of the rotor blade.

12. A rotor blade assembly for a wind turbine, the rotor blade assembly comprising:
    a rotor blade extending from a blade root to a blade tip, the rotor blade having a pressure side surface and a suction side surface, the pressure side surface and the suction side surface each extending between a leading edge and a trailing edge; and,
    a blade root extension configured to attach to a hub of the wind turbine, the blade root extension comprising a plurality of blade fences and a plurality of airflow modifying elements spaced apart in a span-wise direction, each of the plurality of blade fences extending between a proximal end and a distal end in a chord-wise direction, the distal ends remaining free and spaced apart from the rotor blade, the plurality of airflow modifying elements configured at the proximal ends of the blade fences, wherein the blade root extension configured to improve aerodynamic performance of the rotor blade.

13. The rotor blade assembly of claim 12, wherein the blade root extension further comprises a panel element configured to connect the plurality of blade fences on a blade-side of the plurality of blade fences.

14. The rotor blade assembly of claim 12, wherein each of the plurality of blade fences further comprise one or more flanges located on a blade-side of the plurality of fences, wherein each of the flanges are configured to connect to adjacent flanges of adjacent blades fence to form a panel element.

15. The rotor blade assembly of claim 12, wherein each of the plurality of blade fences further comprise an extension portion configured at the distal ends of each of the blade fences.

16. The rotor blade assembly of claim 12, wherein each of the plurality of blade fences and corresponding at least one airflow modifying element has one of a Y-shape or an H-shape.

17. The rotor blade assembly of claim 12, wherein each of the plurality of blade fences and corresponding airflow modifying element has a constant height in the chord-wise direction.

18. The rotor blade assembly of claim 12, wherein the proximal ends of each of the plurality of blade fences are fixed at a location less than or equal to a 50% chord length from the leading edge of the rotor blade.

* * * * *